US009013719B2

United States Patent
Khawaja et al.

(10) Patent No.: US 9,013,719 B2
(45) Date of Patent: Apr. 21, 2015

(54) NON-PRINT MODE IN A MULTIFUNCTION PRINTING DEVICE

(75) Inventors: Naveed Anis Khawaja, Herts (GB); Maliha Naveed, Herts (GB); Adil Memon, Karachi (PK)

(73) Assignee: Xerox Corporation, Norwalk, CT (US)

( * ) Notice: Subject to any disclaimer, the term of this patent is extended or adjusted under 35 U.S.C. 154(b) by 779 days.

(21) Appl. No.: 12/814,569

(22) Filed: Jun. 14, 2010

(65) Prior Publication Data

US 2011/0304870 A1 Dec. 15, 2011

(51) Int. Cl.
*G06F 3/12* (2006.01)
*G06K 15/00* (2006.01)
*B41J 29/38* (2006.01)
*G03G 15/00* (2006.01)

(52) U.S. Cl.
CPC .............. *G06K 15/005* (2013.01); *B41J 29/38* (2013.01); *G03G 15/00* (2013.01); *G03G 15/5004* (2013.01)

(58) Field of Classification Search
USPC .................. 399/37, 50, 51, 69, 70, 85–90
See application file for complete search history.

(56) References Cited

U.S. PATENT DOCUMENTS

| 7,295,786 | B2 | 11/2007 | Brinsley | |
|---|---|---|---|---|
| 2006/0173561 | A1* | 8/2006 | Aoki | 700/52 |
| 2006/0269312 | A1* | 11/2006 | Muraishi | 399/88 |
| 2007/0285718 | A1* | 12/2007 | Aoki et al. | 358/1.16 |
| 2009/0316170 | A1* | 12/2009 | Tsujii | 358/1.9 |
| 2010/0067043 | A1* | 3/2010 | Sasaki | 358/1.15 |
| 2010/0119249 | A1* | 5/2010 | Asaka | 399/70 |

* cited by examiner

*Primary Examiner* — Marcellus Augustin
(74) *Attorney, Agent, or Firm* — Fox Rothschild LLP

(57) ABSTRACT

A multifunction print device and a method of using the multifunction device is disclosed. The multifunction print device includes a user interface comprising at least one input mechanism configured to transmit a user request to enter at least one of a print mode and a non-print mode; a plurality of elements configured to be in either an active or inactive state, wherein the elements comprise one or more first elements configured to perform printing functions and one or more second elements configured to perform non-printing functions; and a control system configured to, in response to a user request to enter non-print mode, switch the one or more second elements from an inactive state to an active state while keeping the one or more second elements in an inactive state.

17 Claims, 5 Drawing Sheets

NON-PRINT MODE IN A MULTIFUNCTION PRINTING DEVICE

BACKGROUND

The present disclosure relates to a printer or multifunction printing device. More specifically, the present disclosure relates to the implementation of a resource-saving, non-printing mode for use with printers and multifunction printing devices.

Copiers, printers, and other multifunction printing devices, such as devices including scanning and facsimile capabilities, are familiar in many office environments. (As used herein, all such machines will be generically called "printers.") A printer is typically a machine having both hardware and software aspects.

It is generally known in the office equipment industry that printers may have active and inactive states. Typically, a printer will be consume more energy during an active state than an inactive state. In many cases, the warm-up time of a printer or multifunction printing device is itself a major consumer of time and energy.

Various aspects of a printer mandate that the machine undergo a distinct time period between the machine being turned on or otherwise requested to operate and the machine being ready to perform a requested task. In the case of xerographic or electrostatographic printers, before moving from an inactive state to an active state, there is typically an appreciable "warm-up" time in which a fuser is brought to a necessary temperature, and/or a charging device is brought to a necessary potential. If the printer utilizes a vacuum transport system, a vacuum blower must be turned on and any vacuum chambers must be brought to a negative pressure. Any toner applying elements may be primed, such as by emitting a small amount of toner to clean and align the applying elements. In the case of an input scanner, which may be part of a digital copier, there is typically a necessary warm-up time for an illumination lamp to reach a necessary luminescence.

SUMMARY

The invention described in this document is not limited to the particular systems, methodologies or protocols described, as these may vary. The terminology used herein is for the purpose of describing particular embodiments only, and is not intended to limit the scope of the present disclosure.

It must be noted that as used herein and in the appended claims, the singular forms "a," "an," and "the" include plural reference unless the context clearly dictates otherwise. Unless defined otherwise, all technical and scientific terms used herein have the same meanings as commonly understood by one of ordinary skill in the art. As used herein, the term "comprising" means "including, but not limited to."

In one general respect, the embodiments disclose a method of operating a multifunction printing device, the multifunction printing device being operable in a print mode and a non-print mode. The method includes initiating, by a processing device of the multifunction printing device, a plurality of elements of a multifunction printing device such that the elements are put into an inactive state until the processing device receives a user request, wherein the plurality of elements include one or more first elements configured to perform printing functions and one or more second elements configured to perform non-printing functions; receiving, at the processing device, a user request to enter a non-print mode; and in response to the user request, switching the one or more second elements from an inactive state to an active state while keeping the one or more first elements in the inactive state.

In another general respect, the embodiments disclose a method of operating a multifunction printing device, the multifunction printing device being operable in a print mode and a non-print mode. The method includes receiving, at a processing device of the multifunction printing device, a user request to process a document; determining, by the processing device, whether the user request requires the device to enter either a print mode or a non-print mode; in response to a user request to enter the print mode, switching a plurality of elements of the multifunction printing device from an inactive state to an active state, wherein the elements include one or more first elements configured to perform printing functions and one or more second elements configured to perform non-printing functions; and in response to the user requesting to enter the non-print mode, switching the one or more second elements from an inactive state to an active state while keeping the one or more first elements in an inactive state.

In another general respect, the embodiments disclose a multifunction print device. The multifunction print device includes a user interface comprising at least one input mechanism configured to transmit a user request to enter at least one of a print mode and a non-print mode; a plurality of elements configured to be in either an active or inactive state, wherein the elements comprise one or more first elements configured to perform printing functions and one or more second elements configured to perform non-printing functions; and a control system configured to, in response to a user request to enter non-print mode, switch the one or more second elements from an inactive state to an active state while keeping the one or more second elements in an inactive state.

DETAILED DESCRIPTION

A "multifunction printing device" is an electronic device that is capable of receiving commands, printing text, characters and/or other images on a substrate, along with other document management functions such as scanning images, storing documents, and faxing documents. An exemplary multifunction printing device is a digital copier capable of printing, copying, scanning, emailing and faxing documents.

A "button" refers to an input selector by which a selection may be made and communicated to a control system or other processing device.

Figure 1:
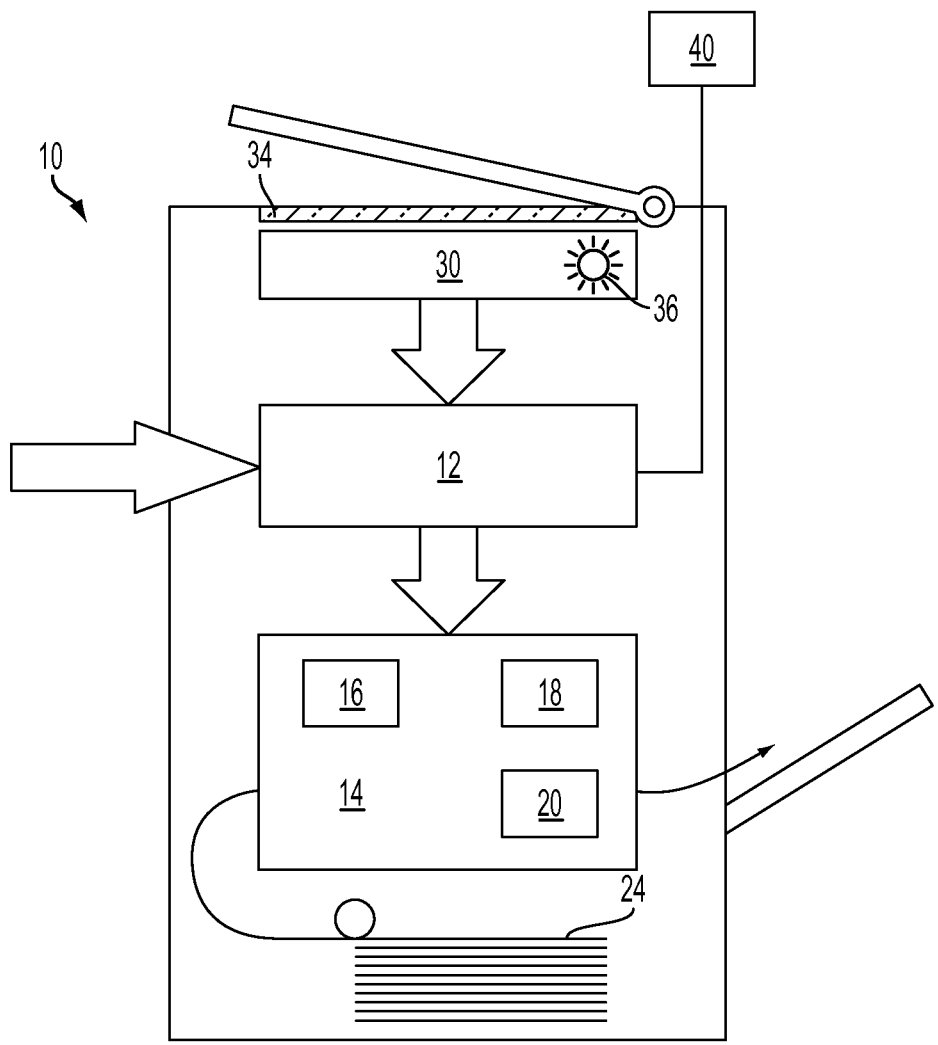
FIG. 1 illustrates an exemplary elevational view of a multifunction printing device according to an embodiment.

FIG. 1 illustrates an elevational view of an exemplary copier/printer, referred to generally as multifunction printing device 10. The multifunction printing device 10 may include a control system 12, which accepts image data from an external source, such as a network. The control system 12 may include a data storage structure, such as an included memory, for retaining print job related data, such as when multiple jobs or other print requests are entered into the control system 12. The control system 12 may include one or more processors, along with ancillary chips such as memory for storage of processor-specific programming instructions. Such processors may require an appreciable amount of time to "boot up" or otherwise become able to process data.

The control system 12 may be operative of what can generally be called a "print engine" 14, that can be of any type familiar in the art of office equipment. A print engine may be defined as any hardware that can be controlled to create a desired image on a sheet. Most types of print engines include at least one motor, such as for moving a sheet relative to the print engine. Such a motor is indicated in a general form as motor 16. The motor 16 may be generally considered to be able to position a sheet drawn from a stack, such as stack 24, to receive an image from the print engine 14. If the print engine 14 is xerographic, the engine may further include at least one device or member, such as a corona device, development unit, or transfer device, which must be brought to a predetermined potential in order to operate. Such a member is generally indicated as charge device 18. If the print engine 14 is of another type, such as ink-jet of some type, the print engine may include heating device, here generally indicated as heating device 20, which must be brought to a predetermined temperature to operate. A heating device in the form of a fuser may be employed in a xerographic printer as well.

Also associated with the control system 12 may be a scanner 30, for recording image data from a hard-copy original that is, for example, placed on a platen 34 or fed through a document handler (not shown). The scanner 30 may include an illumination lamp 36, which must reach a certain brightness in order to operate. The image data recorded at scanner 30 may be retained within control system 12, for substantially instant printing through print engine 14, when the multifunction printing device 10 is operating as a copier. The multifunction printing device 10 may include a user interface 40, such as in the form of a button-pad or touchscreen, by which a user near the multifunction printing device can enter commands (e.g., how many copies to be printed, reduction/enlargement, stapling, email/fax a document, etc.).

As mentioned above, various hardware elements of the multifunction printing device 10, such as the motor 16, the charge device 18, the heating device 20, and/or the illumination device 36, may require an appreciable amount of time to change from an "inactive" state to an active state, in which the hardware elements are ready for outputting prints. In practice, there are two general types of inactive states: "sleep mode" and "power saving mode." In power saving mode, a multifunction printing device may shutdown various hardware elements such as the heating element 20 and/or the charging element 18 after a period of about 30 minutes without receiving a new job to be printed. After a period of additional time, a multifunction printing device may enter sleep mode where additional hardware elements such as the motor 16 and the user interface 40 are shutdown. When a print job is subsequently sent to the printer, any shutdown hardware elements, such as the heating element 20 and the charge element 18, must literally "warm up". Warming up from sleep mode to an active state typically takes approximately one to two minutes.

However, a typical multifunction printing device may perform some activities or jobs that do not require every element of the device to be put into an active state. For example, to scan a document, some elements such as the print engine, the heating element, the charged members, the motor, and various other printing elements do not need to be put into an active state. Rather, only the elements related to scanning may be put into an active state, thereby reducing the time and energy required to perform the job.

Figure 2:
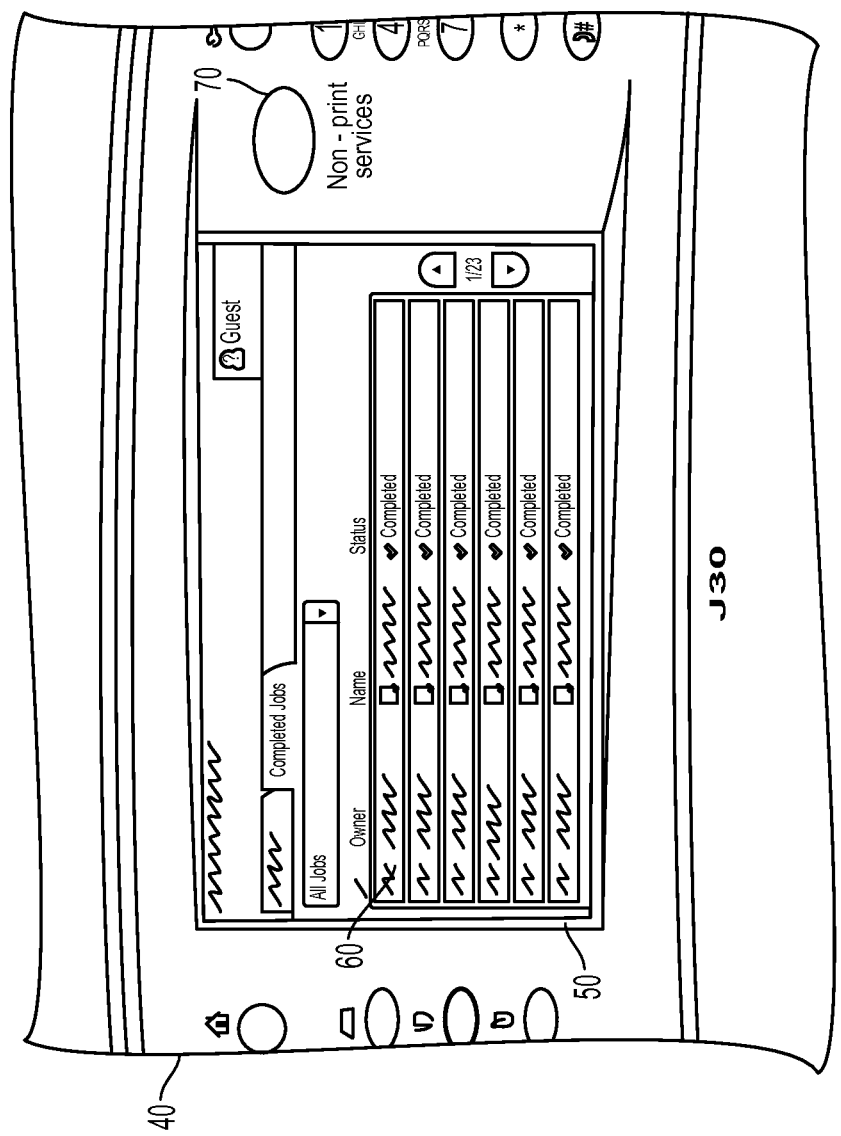
FIG. 2 illustrates an exemplary user interface panel for use with the multifunction printing device of FIG. 1 according to an embodiment.

FIG. 2 illustrates an exemplary user interface 40. The user interface 40 may include a touchscreen 50 listing a series of active or completed jobs 60 that a user may select to further process. The user interface may also include various input mechanisms such as a non-print services button 70. By selecting the non-print services button 70, the user may request that various elements of the multifunction printing device 10 used in non-printing functions such as scanning, faxing, and emailing enter into an active state, while maintaining all the print engine elements in an inactive state. This may result in the multifunction printing device 10 conserving energy and time when compared with conventional devices because nonessential elements do not enter into the active state when performing a non-print function.

Figure 3:
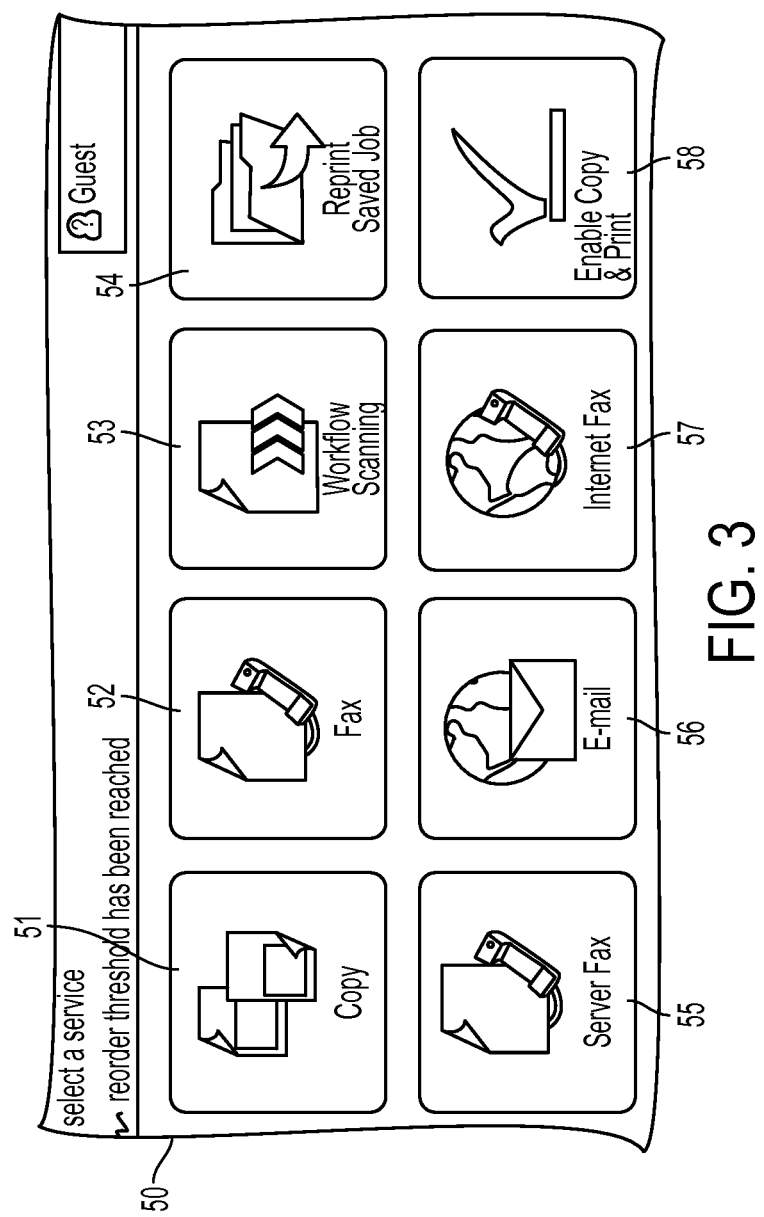
FIG. 3 illustrates an exemplary screenshot of a user interface displayed on the user interface panel of FIG. 2 according to an embodiment.

FIG. 3 illustrates an exemplary screenshot of touchscreen 50 after a user has selected the non-print services button 70. After selection, the touchscreen 50 may display various touchscreen input buttons listing various functions that the multifunction printing device 10 is capable of performing. For example, a list of functions including a copy button 51, a fax button 52, a workflow scanning button 53, a reprint saved job button 54, a server fax button 55, an e-mail button 56, and an Internet fax button 57 may be displayed on touchscreen 50. As a result of the user selecting non-print services button 70, various of the function buttons may be non-selectable, e.g., functions requiring use of the print engine such as copy button 51 and reprint saved job button 54. However, should the user desired to perform a function requiring the use of the print engine, the user may be provided with an enable copy and print button 58. If a user selects this copy and print button 58, the print engine may warm-up and be put into active state, and all function buttons 51-57 of the multifunction printing device may be selectable by the user. For example, if a user wishes to scan a document, the user may select the non-printing services button 70, then select the workflow scanning button 53. However, after scanning if the user decides to make a copy of the scanned document, the user does not need to return to a home screen; rather, the user may select enable copy and print button 58 and, after the necessary print engine warm-up time, the user may select copy button 51 to make a copy of the scanned document.

It should be noted that the functions discussed above, as well as the arrangement of function buttons is shown by way of example only. Various multifunction printing devices may have various capabilities, and those devices' user interfaces may be arranged in a manner to reflect the individual device's capabilities.

Figure 4:
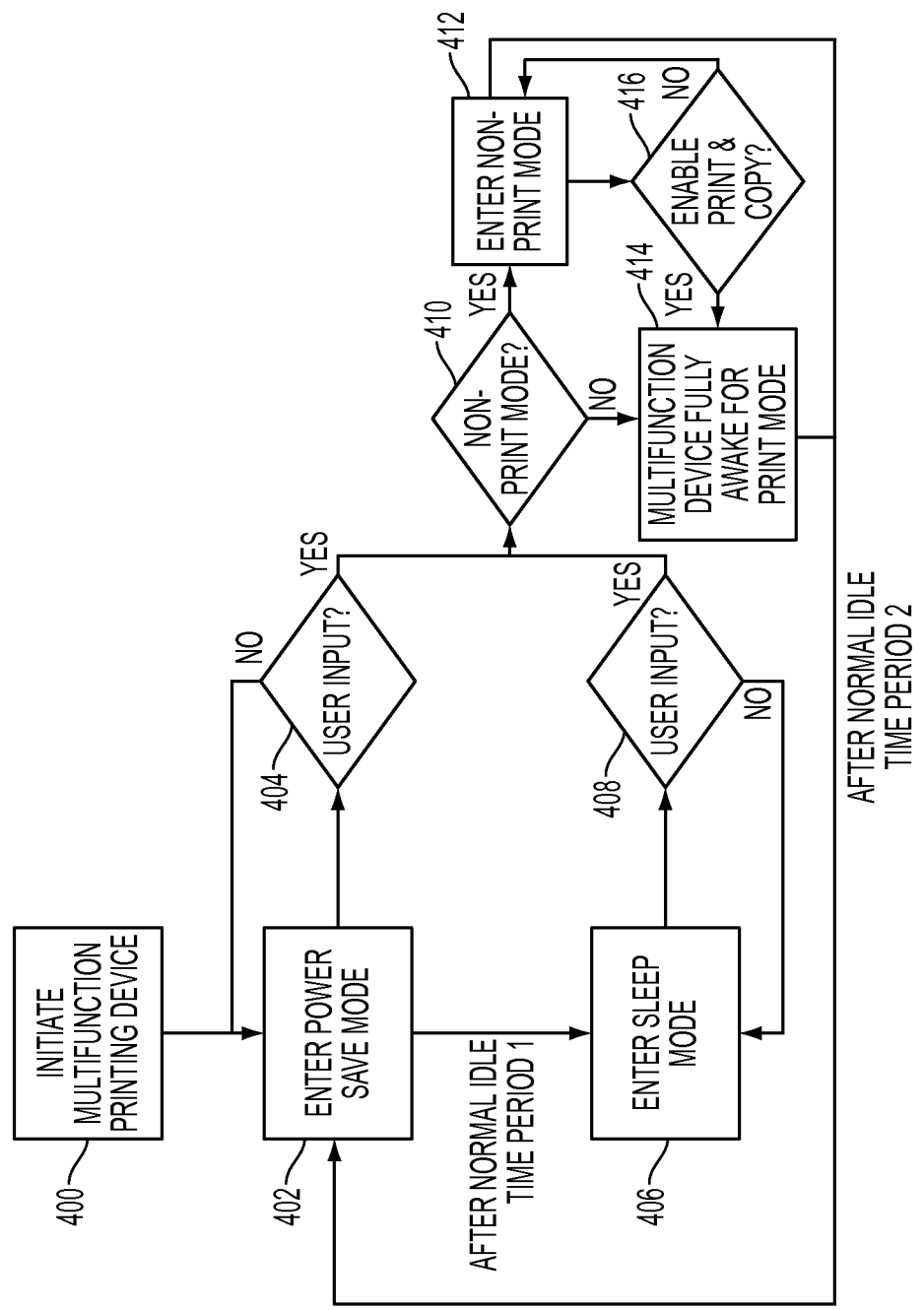
FIG. 4 illustrates a flowchart outlining an exemplary process according to an embodiment.

FIG. 4 illustrates a flowchart showing an exemplary process of operating a multifunction printing device incorporating the features as discussed above in regard to FIGS. 2 and 3. The multifunction printing device may be initiated 400 by physically turning the device on. Initiating 400 the multifunction printing device may occur once a day, e.g., in the morning, or depending on the pattern of use for the multifunction device, on a more or less frequent schedule. Once turned on, the multifunction printing device may perform a start-up routine that may include checking various operating parameters such as verifying a network connection checking paper and toner levels, checking a print queue for unprocessed jobs, and any other various startup related functions. After the multifunction printing device is initiated 400, and the start-up routine is performed, the multifunction printing device may enter 402 a power save mode. In power save mode, various elements of the multifunction printing device may remain in an active state such as the control system, the user interface, and various other elements. For example, when in power save mode, the multifunction printing device may continually or periodically determine 404 whether a user input has been received, or it may simply await a user input. If no user input is received, the multifunction printing device may remain in power save mode. After a normal idle time period, i.e., a period of time where no user input is received, the multifunction printing device may enter 406 sleep mode. Sleep mode may be a "deeper" inactive state than power save mode where all non-essential elements, such as the user interface, are put into an inactive mode. Similar to power save mode, when in sleep mode the multifunction printing device may continually or periodically determine 408 whether a user input is received, or it may await a user input. If no user input is received, the multifunction printing device may remain in sleep mode.

However, if during either determination 404 or 408 of the receipt of user input, the multifunction device receives a user input, the multifunction printing device may further determine 410 whether the user has selected to enter non-print mode, e.g., the user has selected an option such as non-print services button 70 as discussed above in regard to FIG. 2. If the user has selected to enter non-print mode, the multifunction printing device may enter 412 non-print mode and enable only non-print services such as scanning, emailing or faxing to be available to the user. Conversely, if the user selected not to enter non-print mode, the multifunction printing device may put 414 all elements, including the print engine, into a fully active or awake state, thereby enabling the user to access all functions of the multifunction printing device.

It should be noted that non-print mode may further include various additional modes specific to an individual function. For example, if the user selects to scan a document, only the elements used for scanning may be enabled such as an illumination lamp. Similarly, if the user selects to fax a document already stored on the multifunction printing device, only elements used to load and fax the document, such as the control system and a network communication interface, may be enabled.

When in non-print mode, the multifunction printing device may determine 416 whether the user's selection requires the system to enable print and copy functions of the multifunction printing device. If this determination 416 is made, the multifunction printing device may put 414 all elements, including the print engine, into a fully active or awake state, thereby enabling the user to access all functions of the multifunction printing device. If the user opts to remain in non-print mode, the print engine elements may remain in an inactive state until the user specifically requests that print mode be made active. After another normal idle time period during which no user input is received, the multifunction printing device may enter 402 power save mode from either the non-print mode or the print mode. Again, as before, the multifunction printing device may continually determine 404 whether a user input is received. If, after a normal idle time period, no user input is received, the multifunction printing device may enter 406 sleep mode, thereby repeating the process described above.

It should be noted the process illustrated in FIG. 4 is for exemplary purposes only. Various steps discussed therein may be altered depending on the functionality of the multifunction printing device being used. For example, not all multifunction printing devices may have a power save mode and a sleep mode. Additionally, the various normal idle time periods waited before returning to either power save mode or sleep mode may vary between multifunction printing devices. In addition, additional operations may be performed within the scope of this disclosure.

Although the process as described in regard to FIG. 4 specifies that the multifunction printing device have a non-print mode and a print mode, various other modes may be included as well. For example, non-print mode may be further classified based on whether a document on which the operation is to be performed is stored in memory or whether the document has to be obtained first. If a feature is provided to access documents in memory, any elements related to the scanner such as the illumination device may remain in an inactive state, which may further increase the time and energy conserved.

Figure 5:
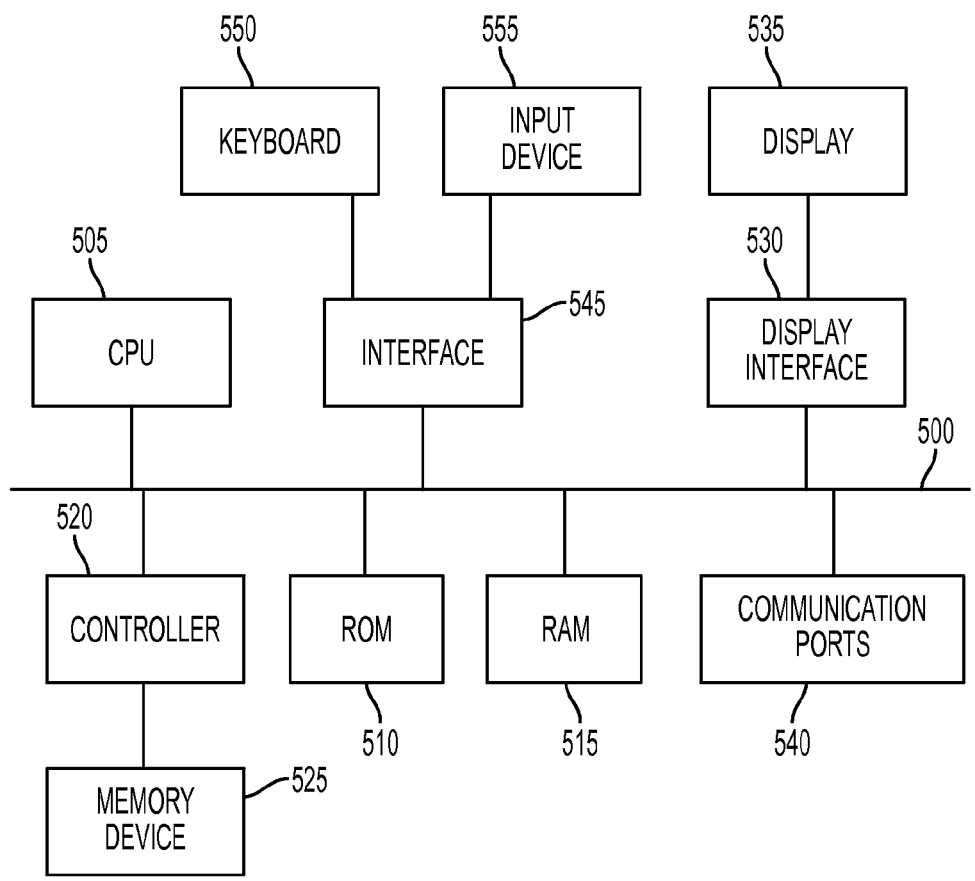
FIG. 5 illustrates various embodiments of a computing device for implementing various methods and processes described herein.

FIG. 5 depicts a block diagram of exemplary internal hardware that may be used to contain or implement program instructions such as instructions for performing the various print mode and non-print mode functions as discussed above, as well as instructions for performing the process shown in FIG. 4. A bus 500 serves as the main information highway interconnecting the other illustrated components of the hardware. CPU 505 is the central processing unit of the system, performing calculations and logic operations required to execute a program. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices. Additionally, the memory devices 525 may be configured to include individual files for storing any feedback information, common files for storing groups of feedback information, or one or more databases for storing the feedback information.

Program instructions, software or interactive modules for providing the digital marketplace and performing analysis on any received feedback may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of operating a multifunction printing device, the multifunction printing device being operable in a print mode and a non-print mode, comprising:
    initiating, by a processing device of the multifunction printing device, a plurality of elements of a multifunction printing device such that the elements are put into an inactive state until the processing device receives a user request, wherein the plurality of elements include one or more first elements configured to perform printing functions and one or more second elements configured to perform non-printing functions;
    receiving, at the processing device, a first user request to enter a non-print mode for processing a document, wherein the non-print mode includes a plurality of non-print functions including at least one of scanning, e-mailing and faxing the document;
    providing, by the processing device, a listing of the non-print functions that are available for selection by the user in response to the first user request to enter non-print mode;
    receiving, at the processing device, a second user request to process the document using at least one of the available non-print functions; and
    in response to the second user request, switching the one or more second elements from an inactive state to an active state while keeping the one or more first elements in the inactive state.

2. The method of claim 1, wherein the one or more first elements comprise at least one of a print engine, a charge device, and a heating device.

3. The method of claim 1, wherein the one or more second elements comprise at least one of a user interface, an illumination lamp, and a scanner.

4. The method of claim 1, wherein receiving the user request comprises receiving the user request via a user interface.

5. The method of claim 4, wherein the user interface comprises at least one input selector configured to transmit a user request to enter non-print mode.

6. The method of claim 5, further comprising:
    receiving a selection of the at least one input selector configured to transmit a user request to enter non-print mode; and
    displaying a listing of the available non-print functions via the user interface.

7. The method of claim 1, further comprising entering a power save mode from either the print mode or the non-print mode after an elapsed idle time.

8. A method of operating a multifunction printing device, the multifunction printing device being operable in a print mode and a non-print mode, comprising:
    receiving, at a processing device of the multifunction printing device, a first user request to process a document;
    determining, by the processing device, whether the first user request requires the device to enter either a print mode or a non-print mode for processing the document, wherein the non-print mode includes a plurality of non-print functions including at least one of scanning, e-mailing and faxing the document;
    in response to a user request to enter the print mode, switching a plurality of elements of the multifunction printing device from an inactive state to an active state, wherein the elements include one or more first elements configured to perform printing functions and one or more second elements configured to perform non-printing functions; and
    in response to the user requesting to enter the non-print mode:
        providing a listing of the non-print functions that are available for selection by the user in response to the first user request to enter non-print mode,
        receiving a second user request to process the document using at least one of the available non-print functions, and
        switching the one or more second elements from an inactive state to an active state while keeping the one or more first elements in an inactive state.

9. The method of claim 8, wherein the one or more first elements comprise at least one of a print engine, a charge device, and a heating device.

10. The method of claim 9, wherein the one or more second elements comprise at least one of an illumination lamp and a scanner.

11. The method of claim 8, wherein receiving the user request comprises receiving the user request via a user interface.

12. The method of claim 11, wherein the user interface comprises at least one input selector configured to transmit a user request to enter non-print mode.

13. The method of claim 12, further comprising:
    receiving a selection of the at least one input selector configured to transmit a user request to enter non-print mode; and
    displaying a listing of the available non-print functions via the user interface.

14. The method of claim 8, further comprising entering a power save mode from either the print mode or the non-print mode after an elapsed idle time.

15. A multifunction print device comprising:
    a user interface comprising at least one input mechanism configured to transmit a first user request to enter at least one of a print mode and a non-print mode for processing a document, wherein the non-print mode includes a plurality of non-print functions including at least one of scanning, e-mailing and faxing the document;
    a plurality of elements configured to be in either an active or inactive state, wherein the elements comprise one or more first elements configured to perform printing functions and one or more second elements configured to perform non-printing functions; and
    a control system configured to, in response to the first user request to enter non-print mode:
        provide a listing of the non-print functions that are available for selection by the user in response to the first user request to enter non-print mode,
        receive a second user request to process the document using at least one of the available non-print functions, and
        switch the one or more second elements from an inactive state to an active state while keeping the one or more second elements in an inactive state.

16. The system of claim 15, wherein the one or more first elements comprise at least one of a print engine, a charge device, and a heating device.

17. The system of claim 15, wherein the one or more second elements comprise at least one of an illumination lamp and a scanner.

* * * * *